United States Patent
Sanders et al.

(10) Patent No.: US 7,697,143 B2
(45) Date of Patent: Apr. 13, 2010

(54) RELIABLE LOW LOSS HOLLOW CORE FIBER RESONATOR

(75) Inventors: Glen A. Sanders, Scottsdale, AZ (US); Andrew Kaliszek, Phoenix, AZ (US); Thien Dang, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 7 days.

(21) Appl. No.: 12/130,662

(22) Filed: May 30, 2008

(65) Prior Publication Data

US 2009/0296098 A1    Dec. 3, 2009

(51) Int. Cl.
*G01C 19/72*   (2006.01)

(52) U.S. Cl. .......................... 356/460; 356/461; 385/39

(58) Field of Classification Search .......... 356/456–465
See application file for complete search history.

(56) References Cited

U.S. PATENT DOCUMENTS

| | | | | |
|---|---|---|---|---|
| 3,649,098 A | * | 3/1972 | Suverison | 385/33 |
| 3,864,019 A | * | 2/1975 | Smolinsky et al. | 385/49 |
| 4,290,667 A | * | 9/1981 | Chown | 385/33 |
| 4,799,754 A | * | 1/1989 | Goldenberg | 385/33 |
| 4,842,409 A | * | 6/1989 | Arditty et al. | 356/460 |
| 5,208,876 A | * | 5/1993 | Pan | 385/11 |
| 5,515,464 A | * | 5/1996 | Sheem | 385/49 |
| 5,815,614 A | * | 9/1998 | Pan | 385/22 |
| 7,327,460 B2 | | 2/2008 | Sanders et al. | |
| 2004/0061863 A1 | | 4/2004 | Digonnet | |
| 2007/0242276 A1 | | 10/2007 | Hughes et al. | |
| 2008/0030741 A1 | | 2/2008 | Digonnet et al. | |

* cited by examiner

*Primary Examiner*—Tarifur Chowdhury
*Assistant Examiner*—Jonathon Cook
(74) *Attorney, Agent, or Firm*—Fogg & Powers LLP

(57) ABSTRACT

An optical coupling device for connecting hollow core optical fiber coils in a fiber optic gyro system. An example fiber optic gyro system includes a recirculator or an integrated optics chip, a fiber coil of hollow core optical fiber with first and second ends, and a coupling device that holds an end of the hollow core optical fiber in an enclosed cavity at some predefined distance from the recirculator or integrated optics chip. The coupling device includes a housing for rigidly holding the fiber end in position. The housing includes a cavity that receives the fiber end.

20 Claims, 3 Drawing Sheets

RELIABLE LOW LOSS HOLLOW CORE FIBER RESONATOR

BACKGROUND OF THE INVENTION

Gyros have been used to measure rotation rates or changes in angular velocity about an axis of rotation. A basic conventional fiber optic gyro (FOG) includes a light source, a beam generating device, and a coil of optical fiber coupled to the beam generating device that encircles an area. The beam generating device transmits light beams into the coil that propagate in a clockwise (CW) direction and a counter-clockwise (CCW) direction along the core of the optical fiber. Many FOGs utilize glass-based optical fibers that conduct light along a solid glass core of the fiber. The two counter-propagating (e.g., CW and CCW) beams may experience different pathlengths while propagating around a rotating closed optical path, and the difference in the two pathlengths is proportional to the rotational rate.

In a resonator fiber optic gyro (RFOG), the counter-propagating light beams are desirably monochromatic (e.g., in a single frequency) and circulate through multiple turns of the fiber optic coil and for multiple passes through the coil using a device, such as a fiber coupler, that redirects light that has passed through the coil back into the coil again (i.e., circulates the light). The beam generating device modulates and/or shifts the frequencies of each of the counter-propagating light beams so that the resonance frequencies of the resonant coil may be observed. The resonance frequencies for each of the CW and CCW paths through the coil are based on a constructive interference condition such that all light-waves having traversed the coil a different number of times interfere constructively at any point in the coil. As a result of this constructive interference, an optical wave having a wavelength $\lambda$ is referred to as "on resonance" when the round trip resonator optical pathlength is equal to an integral number of wavelengths. A rotation of the coil produces a different optical pathlength for clockwise and counterclockwise propagation, thus producing a shift between the respective resonance frequencies of the resonator, and the frequency difference, such as may be measured by tuning the difference in the CW beam and CCW beam frequencies to match the resonance frequency shift of the closed optical path due to rotation, indicates the rotation rate.

Frequency shifters and phase modulators have been used with the beam generating device (e.g., a laser light source) to modulate and shift the frequencies of each of the counter-propagating light beams so that the resonance frequencies of the resonant coil may be observed. The frequency shifters and phase modulators may be difficult to economically implement particularly for smaller scale applications or implementations of the resonator gyro. Alternatively, tunable lasers may be used for introducing the counter-propagating light beams and for resonance detection without the use of frequency shifters and phase modulators. However, when using two or more tunable lasers for resonance detection, the relative frequency noise between such lasers is typically the greatest contributor to angle random walk (ARW) which decreases the rotation rate accuracy of detected by the resonator gyro.

In the RFOG, the glass material of the optical fiber may give rise to effects that shift the resonance frequencies of the CW and CCW paths and thus produce a false indication of rotation or inaccurate measurement of rotation rate. Anomalies stemming from the glass medium that decrease the accuracy of the measurement of the rotational rate may be generated from a non-linear Kerr effect, stimulated Brillouin scattering (SBS), polarization errors, and Rayleigh backscatter errors. These error mechanisms are also sensitive to the environment which, for example, gives rise to unwanted temperature sensitivity. A reflective mirror may be used to circulate the counter-propagating light beams in the coil multiple times but this typically reduces the signal-to-noise ratio.

The non-linear Kerr effect occurs when high monochromatic light power inside the RFOG alters the index of refraction of the glass in the optical fiber. A mismatch of intensities of the CW and CCW beams may induce a bias on the observed frequency shifts on the order of several degrees/hour. SBS occurs when a high intensity associated with a high finesse in the fiber resonator causes lasing or stimulated emission in the glass fiber, and this generally promotes large instabilities in the measurement of the resonance frequencies. Polarization-induced errors may result from fiber couplers that incidentally couple light into a second polarization mode, either from one optical fiber to an adjacent optical fiber or within the same fiber. The second polarization mode may resonate producing an asymmetry in the resonance lineshape of the polarization mode used to measure a rotation. Even though the frequency of the second polarization mode is the same for the CW and CCW beams, the amplitude may be different, thus causing different observations, beyond the affect of rotation, of the resonance frequencies of the CW and CCW beams. Polarization-induced errors may severely limit the accuracy of the RFOG because determination of the resonance centers for each of the resonance frequencies of the CW and CCW beams directly affects the rotational rate measurement. Rayleigh backscatter errors may be a source of drift rate in a resonator gyro. Backscattered light from the glass within the fiber or from imperfections with the fiber can interfere with the circulating light beams and cause significant drift rate errors.

Using hollow core fibers in RFOGs is of great interest for alleviating the aforementioned errors due to light propagation in glass within conventional fibers in RFOGs. In this case light is guided, via the optical band-gap effect down the center of an optical fiber with a hollow core so that the vast majority of light is traveling in free-space (vacuum or air, for instance), greatly reducing the rotation-equivalent error terms that stem from light propagation in a glass core fiber. However, one drawback that this invention addresses is that the fiber end is open to contamination of gases and particulates that may effect optical loss and optical properties of the fiber over time.

SUMMARY OF THE INVENTION

The present invention provides an optical coupling device for connecting hollow core optical fiber resonators in a fiber optic gyro system.

An example fiber optic gyro system includes a recirculator or an integrated optics chip, a resonator with a hollow core optical fiber with first and second ends, and a coupling device that holds an end of the hollow core optical fiber in an enclosed cavity at some predefined distance from the recirculator or integrated optics chip. The coupling device includes a housing for rigidly holding the fiber end in position. The housing includes a cavity that receives the fiber end.

In one aspect of the invention, the housing includes a sleeve and the coupling device includes a glass plate connected to the sleeve. The fiber end is secured to a position within the sleeve a distance greater than 100 microns from the glass plate.

In another aspect of the invention, the glass plate is partially coated with an anti-reflection coating.

In still another aspect of the invention, a plane of the surface normal of the glass plate is angled with respect to the longitudinal axis of the optical fiber to prevent backreflections from the glass plate from re-entering the optical fiber.

In yet another aspect of the invention, the housing includes a ferrule bonded to an end of the sleeve opposite the end of the sleeve that is connected to the glass plate. The ferrule securely receives the fiber coil. The ferrule and sleeve are formed of glass.

BRIEF DESCRIPTION OF THE DRAWINGS

Preferred and alternative embodiments of the present invention are described in detail below with reference to the following drawings:

FIG. 1-2 illustrates a cross-section view of the device shown in FIG. 1;

FIG. 2 illustrates an exploded view of the device shown in FIG. 1;

DETAILED DESCRIPTION OF THE INVENTION

Figure 1:
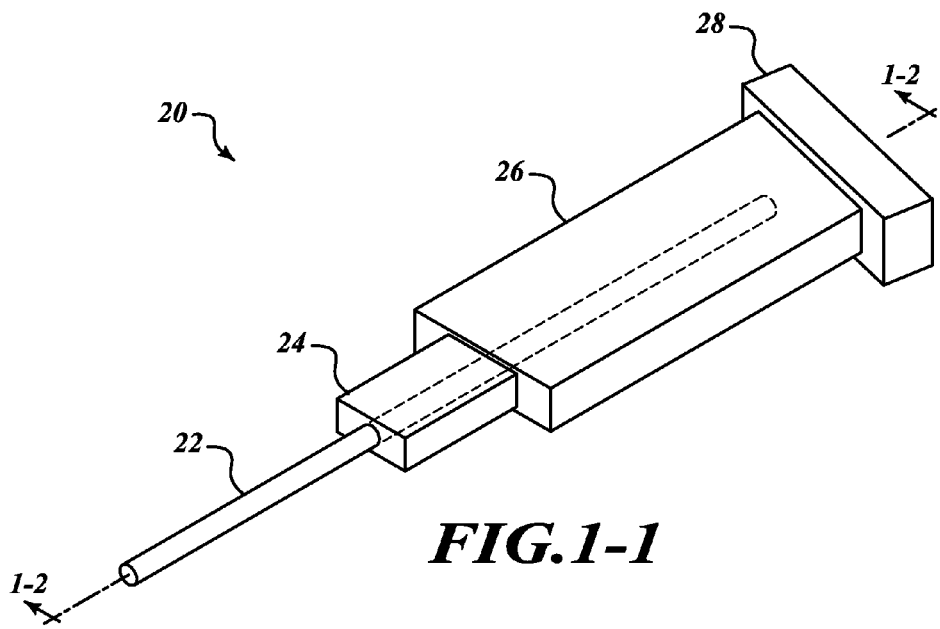
FIG. 1-1 illustrates a perspective view of an end of a fiber optic coil received by a coupling device formed in accordance with the present invention.
Figures 1, 2:
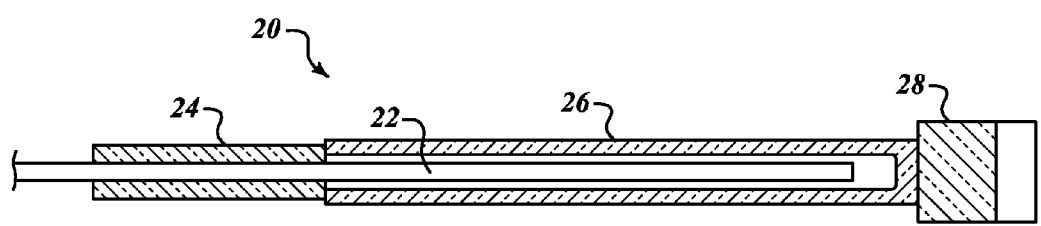
Figure 2:
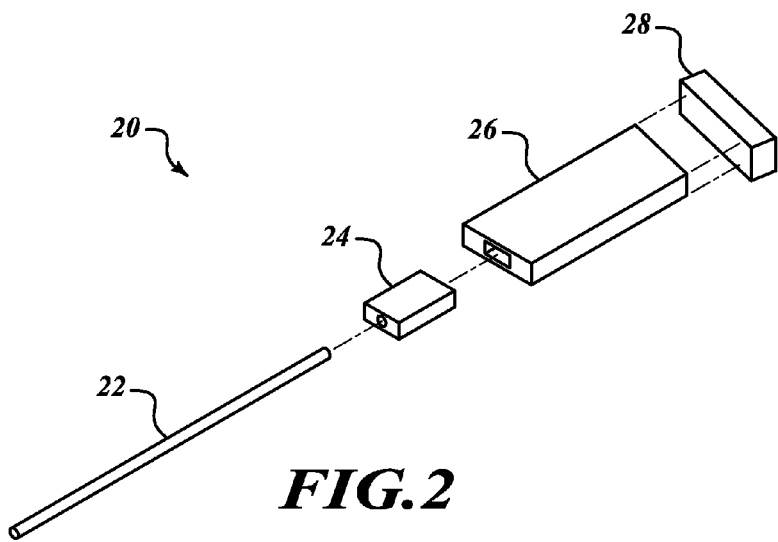

FIGS. 1-1, 1-2 and 2 illustrate various views of a coupling device 20 for attaching an end of a hollow core fiber 22 to optical components included in an interferometric fiber optic gyroscope (IFOG), a resonator fiber optic gyroscope (RFOG), or any other device that would benefit using hollow core fiber, and therefore benefit from reducing the effects that may result with an open-ended hollow core fiber 22.

The device 20 includes a glass ferrule 24, a sleeve 26, and a glass plate 28. The glass ferrule 24 may also be a glass capillary device. The glass ferrule 24 is attached to a first end of the sleeve 26. A second end of the sleeve 26 is attached to one side of the glass plate 28. Both the sleeve 26 and the ferrule 24 include a hollowed out cavity. The cavity within the sleeve 26 is quite a bit larger than the diameter of the hollow core fiber 22. The sleeve 26 and the ferrule 24 are molded or machined from glass. The ferrule 24, the sleeve 26 and the glass plate 28 are attached by any of a number of different types of well-known means, such as standard glass epoxy or solder.

The end of the hollow core fiber 22 is received by the ferrule 24 to a position where the exposed end of the hollow core fiber 22 comes within a predefined distance inside the sleeve 26 from the surface of the glass plate 28. In one embodiment, the distance between the open end of the hollow core fiber 22 within the sleeve 26 and the surface of the glass plate 28 is between $1/10^{th}$ of 1 mm and 2 mm, but may be larger or smaller depending upon how it is to be used. The hollowed out cavity of the ferrule 24 is relieved so that the hollow core fiber 22 may be glued in and sealed in such a manner such that the glue or sealant will not wick. Thus, the space within the sleeve 26 becomes a sealed cavity when the second end of the sleeve 26 is sealed to the glass plate 28.

In one embodiment, the longitudinal axis of the hollow core fiber 22 is angled with respect to the surface normal of the surface of the glass plate 28 to reduce effects of backscattering from the glass plate into the fiber. The tip of the fiber may also be cleaved such that the normal to the endface of the fiber is no longer parallel to the longitudinal axis of the fiber to further prevent backscatter (from light exiting the fiber) from the end of the fiber back into itself or back-reflecting light incident on the fiber tip from free space back toward the glass plate. The glass plate 28 has an anti-reflection coating on one or both sides for low loss, thereby additionally reducing backscattering effects.

Figure 3:
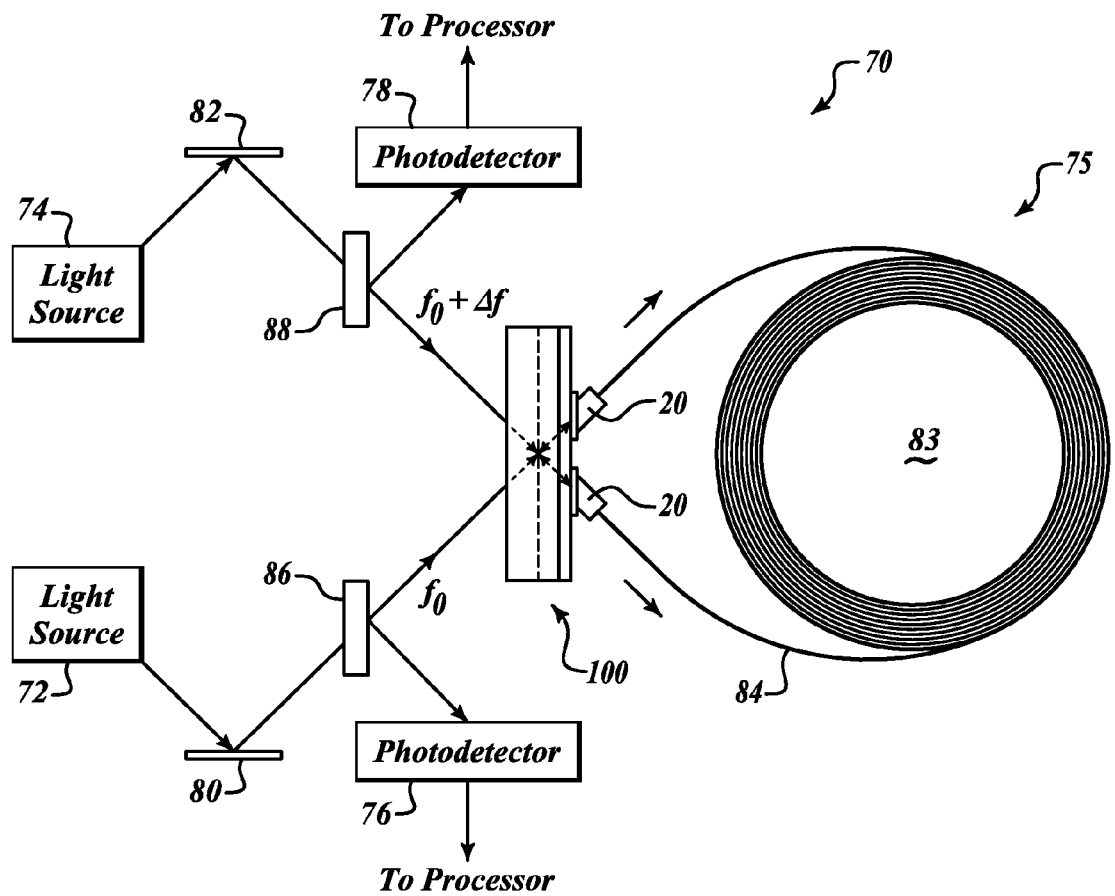
FIG. 3 illustrates a schematic diagram of a resonator fiber optic gyroscope (RFOG) formed in accordance with an embodiment of the present invention.

FIG. 3 is a schematic diagram of a resonator fiber optic gyro (RFOG) 70 in accordance with an exemplary embodiment of the present invention. In one embodiment, the RFOG 70 includes first and second tunable light sources 72, 74 (e.g., tunable lasers) that synthesize light beams, respectively, a resonator 75 that includes a recirculator 100 that introduces the light beams into a fiber coil 83, and first and second photodetectors 76, 78 that receive first and second return beams from the resonator 75. The resonator 75 is a closed optical path having the fiber coil 83, the coupling devices 20, and the recirculator 100. The recirculator 100 may include a high reflectivity mirror with non-zero transmission. The light beam produced by the first tunable source (e.g. laser) 72 is tuned to a frequency $f_o$, and the light beam produced by the second tunable source (e.g. laser) 74 is tuned to a frequency $f_{o+\Delta f}$. The relative frequency drift and jitter between the two laser frequencies is preferably substantially minimized to a level that minimizes or does not affect the accuracy and stability of the frequency shift, and thus rotational rate, measurement. This is accomplished by a laser frequency stabilization technique using electronic servos to lock their beat frequencies to a tunable stable offset that is proportional to rotational rate. Each of the tunable sources (e.g. lasers) 72, 74 may sinusoidally frequency modulate the corresponding generated light beam. Additionally, the RFOG 70 may include additional mirrors 80, 82 and beam splitters 86, 88 for directing the propagation of light beams from the tunable light sources (e.g. lasers) 72, 74 to the resonator 75 and for directing light from the resonator 75 to the photodetectors 76, 78.

The resonator 75 includes a hollow core optical fiber coil 84 having first and second ends coupled to the recirculator 100. The optical fiber coil 84 has multiple turns that encircle an area. The recirculator 100 introduces the light beams (e.g., CW and CCW input light beams) into the hollow core and circulates a portion of the light beams through the optical fiber coil 84. The recirculator 100 reintroduces light emerging from one end of the optical fiber coil 84 into the other end of the fiber coil 84, thus causing light to propagate through the fiber coil 84 many times. The coupling devices 20 (FIGS. 1, 2) connect the ends of the fiber coil 84 to the recirculator 100. The glass plate 28 of the coupling device 20 is placed adjacent to the recirculator 100 or is attached to the recirculator 100 using known attachment means, e.g., epoxy, solder.

Figure 4:
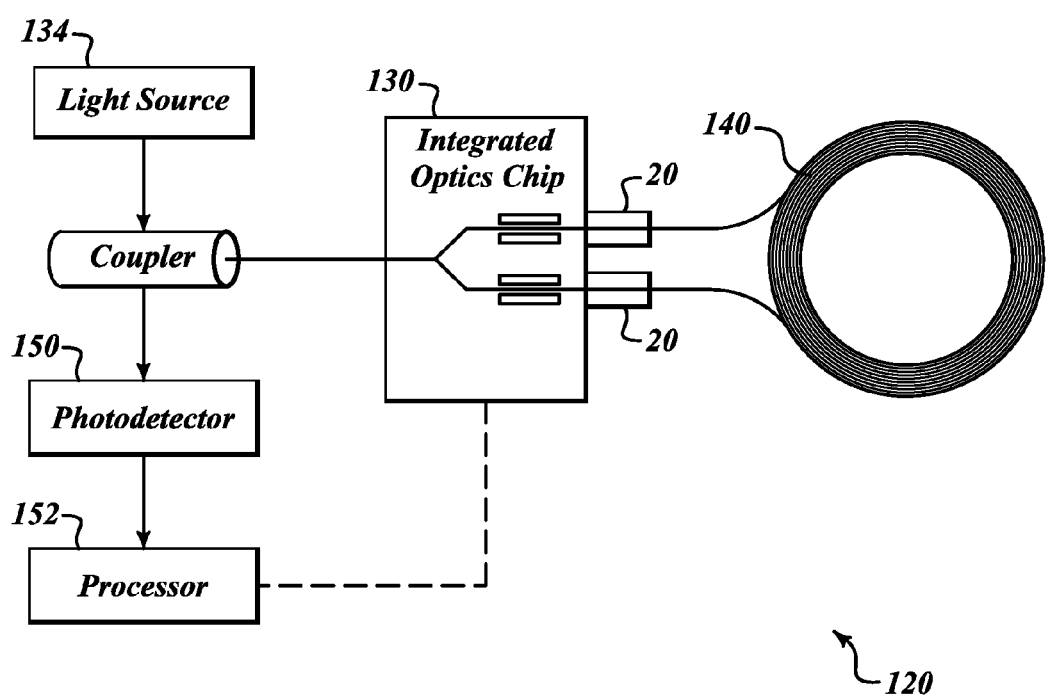
FIG. 4 illustrates a schematic diagram that illustrates components of an interferometric fiber optic gyroscope (IFOG) formed in accordance with an embodiment of the present invention.

FIG. 4 illustrates an interferometric fiber optic gyro (IFOG) 120 that includes the coupling devices 20 (FIGS. 1, 2) for coupling a fiber optic coil 140 having hollow-core fiber optic coil with an integrated optics chip 130. A light source 134 and a photodetector 150 are optically connected to the integrated optics chip 130 via an optical coupler. A processor 152 sends a modulation signal and a control signal to modulators within the integrated optics chip 130 based on signals received from the photodetector 150.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A fiber optic gyroscope comprising:
   at least one optical device, the optical device comprising at least one of a recirculator or an integrated optics chip;
   a fiber optic coil comprising a hollow core optical fiber with first and second ends; and
   at least one coupling device comprising at least one housing having a sealed cavity, the housing rigidly holding the first end of the hollow core optical fiber in the sealed cavity at a position having a predefined distance from the at least one optical device, wherein the sealed cavity defines a free-space medium within the housing between the first end of the hollow core optical fiber and the optical device, the sealed cavity forming a seal for the first end of the hollow core optical fiber, wherein the free-space medium consists either of a gas or a vacuum, and wherein the free-space medium permeates throughout the hollow core fiber.

2. The gyroscope of claim 1, wherein the at least one housing comprises:
   a sleeve having a first end and a second end including at least part of the sealed cavity;
   a ferrule having a first end and a second end, the hollow core optical fiber positioned within the ferrule with the first end of the hollow core optical fiber extending from the second end of the ferrule;
   wherein the second end of the ferrule is attached to the first end of the sleeve so that the first end of the hollow core optical fiber is rigidly held within the sealed cavity.

3. The gyroscope of claim 1, wherein the cavity is configured to communicate optical signals between the first end of the hollow core optical fiber and the optical device.

4. The gyroscope of claim 2, wherein the at least one coupling device further includes a glass plate connected to the second end of the sleeve, wherein the first end of the hollow core optical fiber is secured to a position within the sleeve at a distance between 100 microns and 2 millimeters from the glass plate.

5. The gyroscope of claim 4, wherein the glass plate is at least partially coated with an anti-reflection coating.

6. The gyroscope of claim 4, wherein a normal to the surface of the glass plate is substantially angled from a longitudinal axis of the optical fiber to reduce backscattering of light.

7. The gyroscope of claim 4, wherein the at least one housing further includes a ferrule bonded to an end of the sleeve opposite the end of the sleeve that is connected to the glass plate, the ferrule being configured to securely receive the optical fiber.

8. The gyroscope of claim 7, wherein the ferrule and sleeve are formed of glass.

9. The gyroscope of claim 4, wherein endfaces of the optical fiber ends are angled relative to a longitudinal axis of the optical fiber to substantially reduce the effects of backscattered light from the fiber endface into the core of the optical fiber toward the glass plate.

10. An optical coupling device comprising:
    at least one housing having a cavity, the housing configured to be sealed by insertion of an end of a hollow core optical fiber, wherein the hollow core optical fiber is rigidly held at a position within the first cavity; and
    a glass plate connected to the at least one housing, wherein the position places the end of the hollow core optical fiber at a predefined distance from the glass plate, wherein the sealed cavity defines a free-space medium within the housing between the end of the hollow core optical fiber and the glass plate, the sealed cavity forming a seal for the end of the hollow core optical fiber, wherein the free-space medium consists either of a gas or a vacuum, and wherein the free-space medium permeates throughout the hollow core fiber.

11. The device of claim 10, wherein the at least one housing comprises:
    a sleeve having a first end and a second end including at least part of the cavity;
    a ferrule having a first end and a second end, the ferrule configured to accept the hollow core optical fiber with the first end of the hollow core optical fiber extending from the second end of the ferrule;
    wherein the second end of the ferrule is configured for attachment to the first end of the sleeve so that the first end of the hollow core optical fiber is rigidly held within the sealed cavity.

12. The device of claim 11, wherein the glass plate is at least partially coated with an anti-reflection coating.

13. The device of claim 11, wherein a normal to the surface of the glass plate is angled from a longitudinal axis of the optical fiber to substantially reduce the effects of backscattered light from the glass plate into the fiber.

14. The device of claim 11, wherein the predefined distance is greater than 100 microns and less than 2 millimeters.

15. The device of claim 14, wherein the ferrule and sleeve are formed of glass.

16. The device of claim 11, wherein an endface of the optical fiber is angled relative to a longitudinal axis of the optical fiber to substantially reduce the effects of backscattered light from the fiber endface into the core of the optical fiber toward the glass plate.

17. A fiber optic gyroscope comprising:
    at least one optical device, the optical device comprising at least one of a recirculator or an integrated optics chip;
    a fiber optic coil comprising a hollow core optical fiber with a first end and a second end; and
    a first optical coupling device comprising:
      a first housing having a first sealed cavity, the first housing rigidly holding the first end of the hollow core optical fiber in the first sealed cavity at a first position, wherein the second sealed cavity defines a free-space medium within the housing, wherein the free-space medium consists either of a gas or a vacuum, and wherein the free-space medium permeates throughout the hollow core fiber; and
      a first glass plate having a first surface and a second surface, the first surface of the first glass plate coupled to the first housing and the second surface of the first glass plate coupled to the at least one optical device, wherein the first position is at a first predefined distance from the first surface of the first glass plate; and
    a second optical coupling device comprising:
      a second housing having a second sealed cavity, the second housing rigidly holding the second end of the hollow core optical fiber in the second sealed cavity at a second position, wherein the second sealed cavity defines the free space medium within the housing; and
      a second glass plate having a first surface and a second surface, the first surface of the second glass plate coupled to the second housing and the second surface of the second glass plate coupled to the at least one optical device, wherein the second position is at a second predefined distance from the first surface of the second glass plate.

18. The gyroscope of claim 17, wherein a first normal to the first surface of the first glass plate is substantially angled from a first longitudinal axis of the first end of the optical fiber to reduce backscattering of light; and wherein a second normal to the second surface of the second glass plate is substantially angled from the second longitudinal axis of the second end of the optical fiber to reduce backscattering of light.

19. The gyroscope of claim 17, wherein a first endface of the first end of the hollow core optical fiber is angled relative to a first longitudinal axis of the first end of the hollow core optical fiber to reduce backscattering of light; and wherein a second endface of the second end of the hollow core optical fiber is angled relative to a second longitudinal axis of the second end of the hollow core optical fiber to reduce backscattering of light.

20. The gyroscope of claim 17, wherein the first predefined distance and the second predefined distance are both between 100 microns and 2 millimeters.

* * * * *